UNITED STATES PATENT OFFICE.

WILHELM HERZBERG, OF BERLIN-WILMERSDORF, AND GERHARD HOPPE, OF BERLIN-TREPTOW, GERMANY, ASSIGNORS TO ACTIEN GESELLSCHAFT FUR ANILIN FABRIKATION, OF BERLIN, GERMANY.

DYES.

1,419,502. Specification of Letters Patent. Patented June 13, 1922.

No Drawing. Application filed December 7, 1921. Serial No. 520,697.

*To all whom it may concern:*

Be it known that we, WILHELM HERZBERG and GERHARD HOPPE, citizens of the German Republic, residing at Prinzregentenstr. 10, Berlin-Wilmersdorf, Germany, and Rethelstr. 2, Berlin-Treptow, Germany, have invented certain new and useful Improvements in Dyes, of which the following is a specification.

Our present invention relates to new dyes applicable as pigments and for dyeing fibrous material in the vat.

These dyes form yellow to brown crystals scarcely soluble in organic solvents but soluble in concentrated sulfuric acid with an orange-red to red color. Reduced by sodium hydrosulfite in the presence of sodium hydroxide they yield a reddish to orange vat from which vegetable and animal fibres are dyed yellow to orange tints fast to the action of chlorine and soap.

These new dyes may be manufactured by condensing oxyazines (for instance eurhodols, compare Kehrmann, Berichte der deutschen chemischen Gesellschaft Band 23 page 2453, Zincke, Annalen der Chemie 286, page 56) with a quinonoid compound substituted by a halogen in the quinonoid nucleus, such as 2-chloro-1.4-naphthoquinone, 2.3-dichloro-naphthoquinone, tetrachlorobenzoquinone, 2.3-dichloro-4-naphthsultamquinone.

The manufacture of these dyes may be illustrated by the following examples, without limiting the invention, the parts being by weight:

1. 21 parts of oxytoluphenazine (obtained by condensation of 2-oxy-5-methyl-1.4-benzoquinone and 1.2-diaminobenzene), 23 parts of 2.3-dichloro-1.4-naphthoquinone, 20 parts of calcined sodium acetate, 1 part of cuprous chloride and 400 parts of nitrobenzene are heated for 2 hours to 120° C. When the hot filtrated solution has become cold yellow needles separate; the rest of the condensation product may be obtained by distilling the nitrobenzene with steam. The product of condensation melting at 266° C. dissolves in sulfuric acid (concentrated) with orange-red color. It yields with sodium hydrosulfite and sodium hydroxyde a yellow vat from which cotton is dyed yellow tints.

2. 25 parts of eurhodol, the condensation product of 2-oxy-1.4-naphthoquinone and 1.2-diamino-4-methylbenzene, are heated to 140° C. whilst stirring together with 22 parts of 2.3-dichloro-1.4-naphthoquinone, 22 parts of calcined sodium acetate and 80 parts of nitrobenzene. After an hour the dyestuff is isolated in the manner described in Example 1. It dissolves in concentrated sulfuric acid with orange-red color, cotton is dyed in the hydrosulfite vat yellowish tints.

3. 25 parts of the eurhodol employed in Example 2 are heated for an hour to 120° C. together with 30 parts of 2.3-dichloro-4-naphthsultamquinone (compare Zincke, Annalen der Chemie, 412, page 97), with 20 parts of calcinated sodium acetate and 600 parts of nitrobenzene. After cooling the brown crystallized dye is filtered. It dissolves in concentrated sulfuric acid with orange-red color; with sodium hydrosulfite and sodium hydroxide it forms a reddish-brown vat from which cotton is dyed yellow-brown tints becoming orange by treatment with chlor.

The same dye is obtained by substituting in the foregoing example for the dichloronaphthsultamquinone monochloronaphthsultamquinone.

Having now described our invention and the manner in which it may be performed what we claim is:—

1. The herein-described new dyes being yellow to orange crystals or powders scarcely soluble in organic solvents, soluble in concentrated sulfuric acid with an orange-red to red color, reduced by sodium hydrosulfite in the presence of sodium hydroxide, yielding a vat from which fibrous material is dyed yellow to orange tints, fast to the action of chlorine and soap. these new dyes being condensation products which may be obtained by heating an 1.4-quinonoid compound halogenated in the quinonoid nucleus with an oxyazine.

2. The herein-described new dyes being yellow to orange crystals or powders scarcely soluble in organic solvents, soluble in concentrated sulfuric acid with an orange-red to red color, reduced by sodium hydrosulfite in the presence of sodium hydroxide, yielding a reddish vat from which fibrous material is dyed yellow to orange tints, fast to the action of chlorine and soap, these new dyes being condensation products which may be obtained by heating an 1.4-quinonoid compound halogenated in the quinonoid nucleus with an oxyazine such as can be obtained by condensation of a 2-oxy-1.4-naphthoquinone with an 1.2-diamine of the aromatic series.

3. The herein-described new dyes being yellow to orange crystals or powders scarcely soluble in organic solvents, soluble in concentrated sulfuric acid with an orange-red to red color, reduced by sodium hydrosulfite in the presence of sodium hydroxide, yielding a reddish vat from which fibrous material is dyed yellow to orange tints fast to the action of chlorin and soap, these new dyes being condensation products which may be obtained by heating an 1.4-quinonoid compound halogenated in the quinonoid nucleus with an oxyazine such as can be obtained by condensation of a 2-oxy-1.4-naphthoquinone with an 1.2-diamine of the benzene series.

4. The herein-described new dyes being yellow to orange crystals or pulverized powders, scarcely soluble in organic solvents, soluble in concentrated sulfuric acid with an orange to red color, reduced by sodium hydrosulfite in the presence of sodium hydroxide, yielding a reddish vat from which fibrous material is dyed yellow to orange tints fast to the action of chlorine and soap, these new dyes being condensation products which may be obtained by heating an 1.4-quinonoid compound of the naphthalene series halogenated in the quinonoid nucleus with an oxyazine, such as can be obtained by condensation of a 2-oxy-1.4-naphtho-quinone with an 1.2-diamine of the benzene series.

5. The herein-described new dyes being yellow to orange crystals or powders, scarcely soluble in organic solvents, soluble in concentrated sulfuric acid with an orange-red to red color, reduced by sodium hydrosulfite in the presence of sodium hydroxide, yielding a reddish vat from which fibrous material is dyed yellow to orange tints fast to the action of chlorin and soap, these new dyes being condensation products which may be obtained by heating 1.4-naphthoquinone halogenated in the quinonoid nucleus with an oxyazine such as can be obtained by condensation of 2-oxy-1.4-naphthoquinone with an 1.2-diamine of the benzene series.

6. The herein-described new dyes being yellow to orange crystals or powders scarcely soluble in organic solvents, soluble in concentrated sulfuric acid with an orange-red to red color, reduced by sodium hydrosulfite in the presence of sodium hydroxide yielding a reddish vat from which fibrous material is dyed yellow to orange tints fast to the action of chlorine and soap, these new dyes being condensation products which may be obtained by heating 2.3-dihalogeno-1.4-naphthoquinone with an oxyazine such as can be obtained by condensation of 2-oxy-1.4-naphthoquinone with an 1.2-diamine of the benzene series.

7. The herein-described new dyes being yellow to orange crystals or powders scarcely soluble in organic solvents, soluble in concentrated sulfuric acid with an orange-red to red color, reduced by sodium hydrosulfite in the presence of sodium hydroxide yielding a reddish vat from which fibrous materials is dyed yellow to orange tints fast to the action of chlorine and soap, these new dyes being condensation products which may be obtained by heating 2.3-dichloro-1.4-naphthoquinone with an oxyazine such as can be obtained by condensation of 2-oxy-1.4-naphthoquinone with an 1.2-diamine of the benzine series.

In testimony whereof we affix our signatures in presence of two witnesses.

WILHELM HERZBERG.
GERHARD HOPPE.

Witnesses:
O. SCHARFENBERG,
M. BREMNER.